United States Patent
Stone et al.

(10) Patent No.: US 11,893,566 B2
(45) Date of Patent: Feb. 6, 2024

(54) AEROSPACE COMMERCE EXCHANGE

(71) Applicant: SMARTSKY NETWORKS, LLC, Morrisville, NC (US)

(72) Inventors: Ryan Mitchell Stone, Charlotte, NC (US); Blane Edward Rockafellow, Raleigh, NC (US); Bryan S. Trainum, Williamsburg, VA (US); Charles Jason Rinker, Wake Forest, NC (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 655 days.

(21) Appl. No.: 17/115,983

(22) Filed: Dec. 9, 2020

(65) Prior Publication Data
US 2021/0117955 A1 Apr. 22, 2021

Related U.S. Application Data

(63) Continuation of application No. 15/884,468, filed on Jan. 31, 2018, now Pat. No. 10,891,607.
(Continued)

(51) Int. Cl.
*G06Q 20/32* (2012.01)
*G06Q 20/38* (2012.01)
(Continued)

(52) U.S. Cl.
CPC ........... *G06Q 20/325* (2013.01); *G06Q 10/20* (2013.01); *G06Q 20/085* (2013.01); *G06Q 20/12* (2013.01);
(Continued)

(58) Field of Classification Search
CPC .... G06Q 20/325; G06Q 10/20; G06Q 20/085; G06Q 20/12; G06Q 20/14; G06Q 20/382; G06Q 20/401; G06Q 30/06; G06Q 50/30
See application file for complete search history.

(56) References Cited

U.S. PATENT DOCUMENTS 9,325,793 B1 * 4/2016 Stone .................. H04L 67/142
10,074,283 B1 9/2018 de Oliveira et al.
(Continued)

FOREIGN PATENT DOCUMENTS

CN 101082968 A 12/2007
CN 101971160 A 2/2011
(Continued)

OTHER PUBLICATIONS

C. R. Brinton and S. C. Atkins, "Local data exchange for airport surface trajectory-based operations," 2008 Integrated Communications, Navigation and Surveillance Conference, Bethesda, MD, 2008, pp. 1-8, doi: 10.1109/ICNSURV.2008.4559182. (Year: 2008).*
(Continued)

*Primary Examiner* — Jessica Lemieux
(74) *Attorney, Agent, or Firm* — Burr & Forman LLP

(57) ABSTRACT

An aerospace commerce exchange system may include a network, a plurality of clients operably coupled to the network, and an aerospace commerce exchange platform operably coupled to the network to provide exchange services to the clients. At least one of the clients may be operably coupled to the aerospace commerce exchange platform via an air-to-ground wireless communication link or satellite link (or other links with which an aircraft may be associated) to provide or receive data associated with at least one of the exchange services.

20 Claims, 6 Drawing Sheets

Related U.S. Application Data

(60) Provisional application No. 62/454,248, filed on Feb. 3, 2017.

(51) Int. Cl.
| | | |
|---|---|---|
| *G06Q 20/40* | (2012.01) | |
| *G06Q 30/06* | (2023.01) | |
| *G06Q 50/10* | (2012.01) | |
| *G06Q 50/30* | (2012.01) | |
| *H04W 4/38* | (2018.01) | |
| *G06Q 20/14* | (2012.01) | |
| *G06Q 20/08* | (2012.01) | |
| *H04L 9/32* | (2006.01) | |
| *G06Q 10/20* | (2023.01) | |
| *H04W 4/44* | (2018.01) | |
| *G06Q 20/12* | (2012.01) | |

(52) U.S. Cl.
CPC .......... *G06Q 20/14* (2013.01); *G06Q 20/382* (2013.01); *G06Q 20/401* (2013.01); *G06Q 30/06* (2013.01); *G06Q 50/10* (2013.01); *G06Q 50/30* (2013.01); *H04L 9/3239* (2013.01); *H04W 4/38* (2018.02); *H04W 4/44* (2018.02)

(56) References Cited

U.S. PATENT DOCUMENTS

| | | |
|---|---|---|
| 2002/0091543 A1 | 7/2002 | Thakur |
| 2007/0208719 A1 | 9/2007 | Tran |
| 2009/0070841 A1 | 3/2009 | Buga et al. |
| 2014/0053243 A1 | 2/2014 | Walsh |
| 2014/0075506 A1 | 3/2014 | Davis |
| 2014/0136589 A1 | 5/2014 | Wahler et al. |
| 2016/0112852 A1* | 4/2016 | Sarma .................. G06Q 50/14 455/414.1 |
| 2017/0103468 A1 | 4/2017 | Orsini |
| 2019/0020661 A1 | 1/2019 | Zhang |

FOREIGN PATENT DOCUMENTS

| | | |
|---|---|---|
| CN | 104053044 A | 9/2014 |
| JP | 2010524316 A | 7/2010 |
| JP | 2011504664 A | 2/2011 |
| JP | 2013028341 A | 2/2013 |
| JP | 2014028614 A | 2/2014 |
| JP | 2016219014 A | 12/2016 |
| KR | 1020160127878 A | 11/2016 |
| WO | 2009042714 A2 | 4/2009 |

OTHER PUBLICATIONS

Notice of Preliminary Rejection in corresponding Korean Application No. 10-2019-7025875 dated Jan. 18, 2023, all pages cited in its entirety.
Notice of Reasons for Refusal from Japanese Application No. 2021-124861 dated Aug. 23, 2022, all pages cited in Its entirety.
Office Action from corresponding Indonesian Application No. P00202102219 dated Mar. 8, 2023, all pages cited in Its entirety.
Decision to Grant from corresponding Japanese Application No. 2021-124861 dated Mar. 22, 2023, all pages cited in its entirety.
Office Action from corresponding Chinese Application No. 201880011388.1 dated Mar. 29, 2023, all pages cited in its entirety.
International Search Report and Written Opinion of PCT/US2019/048314 dated Oct. 23, 2019, all enclosed pages cited.
Office Action issued in corresponding Japanese Application No. 2019-542081 dated Dec. 22, 2020, all enclosed pages cited.
Summons to Oral Proceedings issued in corresponding European Application No. 18706593.3 dated Feb. 5, 2021, all enclosed pages cited.
Office Action issued in corresponding U.S. Appl. No. 15/884,468 dated May 1, 2020, all enclosed pages cited.
Office Action issued in corresponding European Application No. 18706593.3 dated Jun. 5, 2020, all enclosed pages cited.
International Search Report and Written Opinion of PCT/US2018/016639 dated Apr. 10, 2018, all enclosed pages cited.
Office Action from related U.S. Appl. No. 16/114,756 dated Mar. 31, 2021, all pages cited in its entirety.
Decision of Refusal from related JP application No. 2019-542081 dated Apr. 20, 2021, all pages cited in its entirety.

* cited by examiner

AEROSPACE COMMERCE EXCHANGE

CROSS REFERENCE TO RELATED APPLICATION

This application is a continuation of U.S. application Ser. No. 15/884,468 filed on Jan. 31, 2018 which claims priority to U.S. application No. 62/454,248 filed Feb. 3, 2017, the entire contents of which are hereby incorporated by reference in its entirety.

TECHNICAL FIELD

Example embodiments generally relate to aerospace industry technologies and, in particular, relate to apparatuses, systems, methods and networks for facilitating commerce and for managing various aspects of communication that can directly or indirectly impact commerce within the aerospace industry.

BACKGROUND

The aerospace industry is comprised of hundreds of vendors and partners, creating a complex ecosystem in which access to information tends to be restricted within specific silos created by specific entities or partnerships. Furthermore, much of the underlying technology that supports these individual silos of information is very old. For example, air traffic control, ticketing and other functions are controlled via antiquated and often proprietary technologies that are not in any way contemplated for connection to each other or to other platforms. This antiquated system results in a fragmented environment that limits opportunities for sharing information and participation in ecommerce.

Meanwhile, real-time connectivity to aircraft has also been limited until recently. The limited ability to communicate with aircraft in real-time has inhibited any ability to get a comprehensive picture that would otherwise be needed for complete operational management. This lack of connectivity, coupled with the fragmented information in the aerospace industry in general, had basically left ecommerce disconnected from aviation since aerospace data is not readily accessible to ecommerce partners. As we are well within the digital age, it is clear that this system can be improved.

Accordingly, it may be desirable to develop a commerce exchange that connects aviation and ecommerce and facilitates elimination of the issues discussed above. Moreover, it may be desirable to continue to develop improved and/or more efficient mechanisms by which to allow real-time connectivity with aircraft to facilitate further integration of the information thereon into ecommerce channels and related applications.

BRIEF SUMMARY OF SOME EXAMPLES

Accordingly, some example embodiments may enable the provision of an aerospace commerce exchange that allows ecommerce activities to be maximized with respect to any connectivity in an aerospace context. Thus, for example, in some cases inflight bi-directional connectivity without the latency of satellite-based solutions, and with a robust return link, may effectively be used to its fullest potential in integration with ecommerce opportunities. The aerospace commerce exchange (ACE) may be a connector of users, buyers and sellers of aerospace data, so that inaccessibility of data, or the complications associated with trying to access such data, can be a thing of the past. However, it should be appreciated that not all such data need originate from or pass through an in-flight asset, as example embodiments may apply to some cases that do not.

In an example embodiment, an aerospace commerce exchange system is provided. The system may include a network, a plurality of clients, which may themselves be platforms, operably coupled to the network, and an aerospace commerce exchange platform operably coupled to the network to provide exchange services to the clients. At least one of the clients may be operably coupled to the aerospace commerce exchange platform via an air-to-ground wireless communication link or satellite link or air-to-air link or air-to-sea link to provide or receive data associated with at least one of the exchange services.

In another example embodiment, a platform for providing exchange services associated with an aerospace commerce exchange system may be provided. The platform may be accessible to a plurality of clients via a network. The platform may include processing circuitry configured to provide at least one of the exchange services based on data received from at least one of the clients via an air-to-ground wireless communication link or satellite or air-to-air link or air-to-sea link link.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
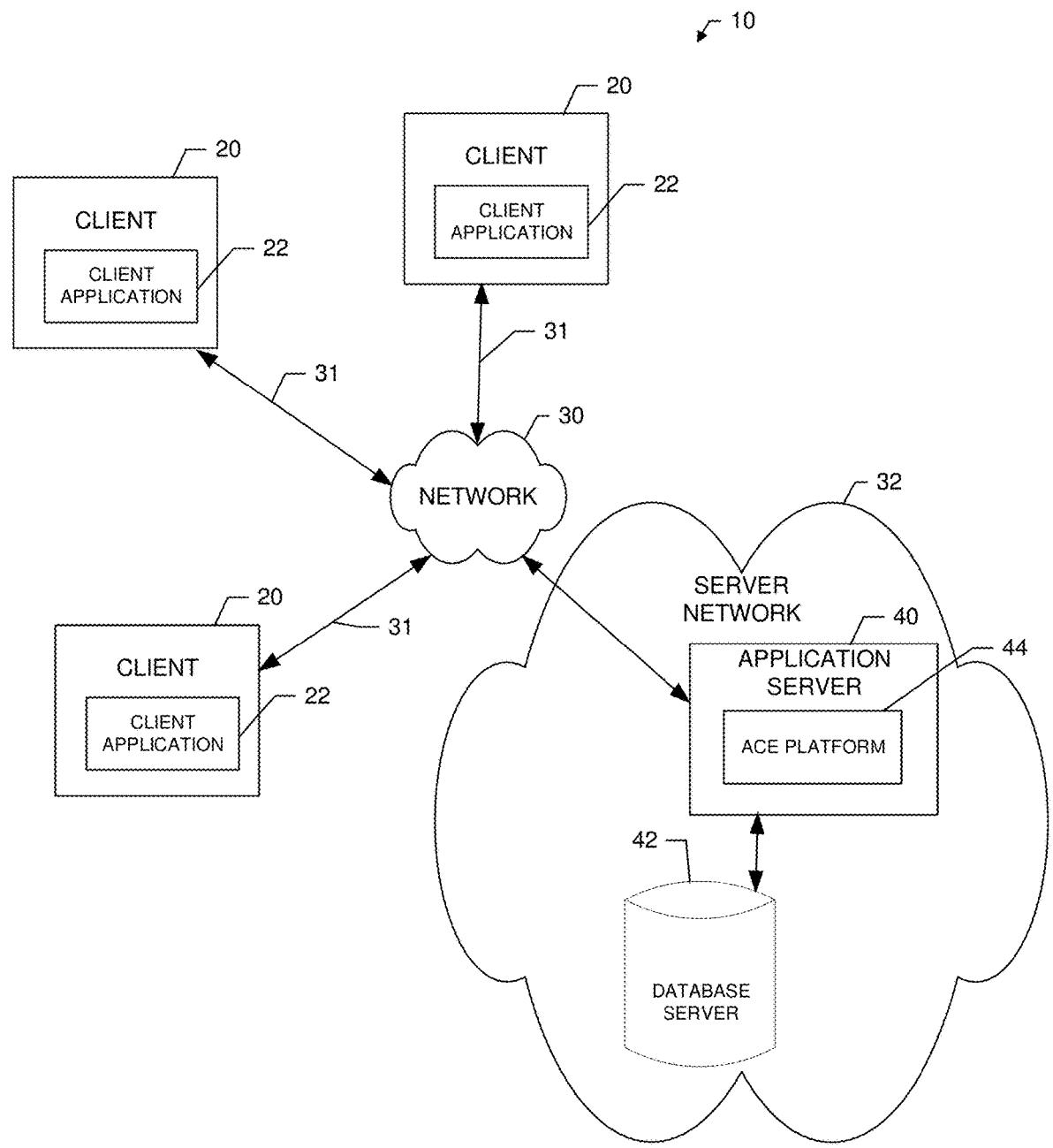
FIG. 1 illustrates a functional block diagram of a system that may be useful in connection with providing exchange services according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Additionally, when the term "data" is used, it should be appreciated that the data may in some cases include simply data or a particular type of data generated based on operation of algorithms and computational services, or, in some cases, the data may actually provide computations, results, algorithms and/or the like that are provided as services.

As used in herein, the term "module" is intended to include a computer-related entity, such as but not limited to hardware, firmware, or a combination of hardware and software (i.e., hardware being configured in a particular way by software being executed thereon). For example, a module may be, but is not limited to being, a process running on a processor, a processor (or processors), an object, an executable, a thread of execution, and/or a computer. By way of example, both an application running on a computing device and/or the computing device can be a module. One or more modules can reside within a process and/or thread of execution and a module may be localized on one computer and/or distributed between two or more computers. In addition, these components can execute from various computer readable media having various data structures stored thereon. The modules may communicate by way of local and/or remote processes such as in accordance with a signal having one or more data packets, such as data from one module interacting with another module in a local system, distributed system, and/or across a network such as the Internet with other systems by way of the signal. Each respective module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide for a data processing platform that can be instantiated at an apparatus comprising configurable processing circuitry. The processing circuitry may be configured to execute various processing functions on aerospace (or aviation) data using the techniques described herein. The data processing platform may, for example, be configured to provide an information exchange via which multiple independent or even proprietary platforms may be connected to each other. As such, the data processing platform may be embodied as an aerospace commerce exchange platform (i.e., ACE platform) that connects data producers to data consumers within the aerospace industry. By enabling data from a variety of sources to be shared, new insights may be available. Moreover, digital rights management services may be employed to control the usage of data on mutually agreeable terms for all participants who access the ACE platform. Accordingly, a commercial framework to connect data providers with current and future data consumers without the need for direct contracting between parties can be provided. This stands in contrast to today's paradigm in which only specific partners who agree to contract with each other to share data may exchange information. Thus, even where information exchange is provided, the fragmenting of information remains in place such that those specific partnerships that are developed still stand apart from other partnerships and from the greater community of producers and consumers of data. The creation of one exchange platform via which a cohesive experience for tying all partners together will not only simplify information exchange, but will vastly expand the potential for future development of technologies. In some cases, augmenting the general lack of a need for some contacts between parties, the ACE platform may provide a mechanism by which to expedite contracts for specific platform related data or transactions (e.g., in the form of smart contracts).

Example embodiments not only provide the ACE platform, but also provide various enabling technologies that may facilitate operation of the ACE platform itself or of components that may interact with the ACE platform. Example embodiments may also provide for enhancement of specific portions of the exchange environment that is created by the ACE platform. The ACE platform may provide a mechanism by which to enhance ecommerce with in-flight assets via ATG or satellite links or air-to-air links or air-to-sea links, but may also be used for data shared about in-flight assets between entirely terrestrial entities. Thus, aircraft still on the ground using a Wi-Fi, cellular or other terrestrial network may still participate in the ACE. Moreover, ground or sea services related to aircraft, but which never actually touch the aircraft itself may also participate in the ACE. For example, historical data for determining inventory stocking levels based on flight routes and historical data for airport based marketing campaigns that target travelers after they land may be accessible via the ACE platform.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that a single client or many more clients 20 may be included in some embodiments and thus, the three clients 20 of FIG. 1 are simply used to illustrate a potential for a multiplicity of clients 20 and the number of clients 20 is in no way limiting to other example embodiments. In this regard, example embodiments are scalable to inclusion of any number of clients 20 being tied into the system 10. Furthermore, in some cases, some embodiments may be practiced on a single client without any connection to the system 10.

The clients 20 may, in some cases, each be associated with a single organization, department within an organization, or location (i.e., with each one of the clients 20 being associated with an individual analyst of an organization, department or location). However, in some embodiments, each of the clients 20 may be associated with different corresponding locations, departments or organizations. For example, among the clients 20, one client may be associated with a first facility of a first organization and one or more of the other clients may be associated with a second facility of either the first organization or of another organization. In some cases, individual ones of the clients 20 may correspond to respective different aircraft manufacturers, aircraft operators, aircraft maintenance/repair/overhaul (MRO) providers, original equipment manufacturers (OEM) for aviation equipment, or other data producers and consumers that are involved in the aerospace industry or that provide services that may be useful to those within the aerospace industry. Additionally or alternatively, individual ones of the clients 20 may be individual aircraft, plants, divisions, facilities or the like of the entities listed above (or other similar entities). Furthermore, individual ones of the clients 20 may sometimes be other organizations, entities or the like that may wish to consume or contribute to the data produced in the aerospace industry by the preceding entities for participation in ecommerce or the provision of services to such organizations or entities. In general, the clients 20 may be referred to as members of the aerospace commerce exchange or ACE members. However, clients 20 may alternatively or additionally sometimes be companies or individuals on the "edge" of the aerospace industry. Some ACE members may therefore be aerospace or non-aerospace entities.

Each one of the clients 20 may include one or more instances of a communication device such as, for example, a computing device (e.g., a computer, a server, a network access terminal, a personal digital assistant (PDA), radio equipment, cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients 20 as described below. In an example embodiment, one or more of the clients 20 (but not necessarily all of them) may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30 as described herein. The information or services receivable at the client applications 22 may include deliverable components (e.g., downloadable software to configure the clients 20, or information for consumption/processing at the clients 20). As such, for example, the client application 22 may include corresponding executable instructions for configuring the client 20 to provide corresponding functionalities for sharing, processing and/or utilizing aerospace (or aviation) data as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms (e.g., links 31) and corresponding communication protocols. In an example embodiment, at least one of the links 31 may be a real-time air-to-ground (ATG) communication link between an airborne asset (e.g., an aircraft, drone, or other non-terrestrial device) and the network 30.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the aircraft, components, terminals or computers with which the clients 20 are associated. For example, the application server 40 may be configured to provide for storage of information descriptive of events or activities associated with one or more aircraft, and/or content produced thereon or intended for delivery thereto. In some cases, these contents may be stored in the database server 42 with or without information identifying entities associated with such information. Alternatively or additionally, the application server 40 may be configured to provide ecommerce, contracting, development, analytical or other tools for use by the clients 20 in accordance with example embodiments. Thus, although some data and/or services may be exchanged amongst members as exchange services, where specific needs or desires are present to contract with other members, the ACE platform 44 may be configured to provide tools for such contracting, and/or provide tools for generation of applications associated with handling such contracting to reduce or even eliminate negotiation in some cases.

In some embodiments, for example, the application server 40 may therefore include an instance of an ACE platform 44 comprising stored instructions for handling activities associated with practicing example embodiments as described herein. As such, in some embodiments, the clients 20 may access the ACE platform 44 online and utilize the services provided thereby. However, it should be appreciated that in other embodiments, the ACE platform 44 (or components thereof) may be provided from the application server 40 (e.g., via download over the network 30) to one or more of the clients 20 to enable recipient clients to instantiate an instance of the ACE platform 44 for local operation such that the ACE platform 44 may be a distributed collection of components. As yet another example, the ACE platform 44 may be instantiated at one or more of the clients 20 responsive to downloading instructions from a removable or transferable memory device carrying instructions for instantiating the ACE platform 44 at the corresponding one or more of the clients 20. In such an example, the network 30 may, for example, be a peer-to-peer (P2P) network where one of the clients 20 includes an instance of the ACE platform 44 to enable the corresponding one of the clients 20 to act as a server to other clients 20.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the ACE platform 44 configured to operate in accordance with an example embodiment of the present invention. In this regard, for example, the ACE platform 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which consumers, developers, analysts or others may interact with, configure or otherwise maintain the system 10.

As such, the environment of FIG. 1 illustrates an example in which provision of content and information associated with the aerospace industry (e.g., including at least some data provided to/from aircraft in real-time) may be accomplished by a particular entity (namely the ACE platform 44 residing at the application server 40). However, it should be noted again that the ACE platform 44 could alternatively handle provision of content and information within a single organization or entity. Thus, in some embodiments, the ACE platform 44 may be embodied at one or more of the clients 20 and, in such an example, the ACE platform 44 may be configured to handle provision of content and information associated with tasks that are associated only with the corresponding single organization. Access to the ACE platform 44 may therefore be secured as appropriate for the organization or organizations involved and credentials of individuals or entities attempting to utilize the tools provided herein.

Figure 2:
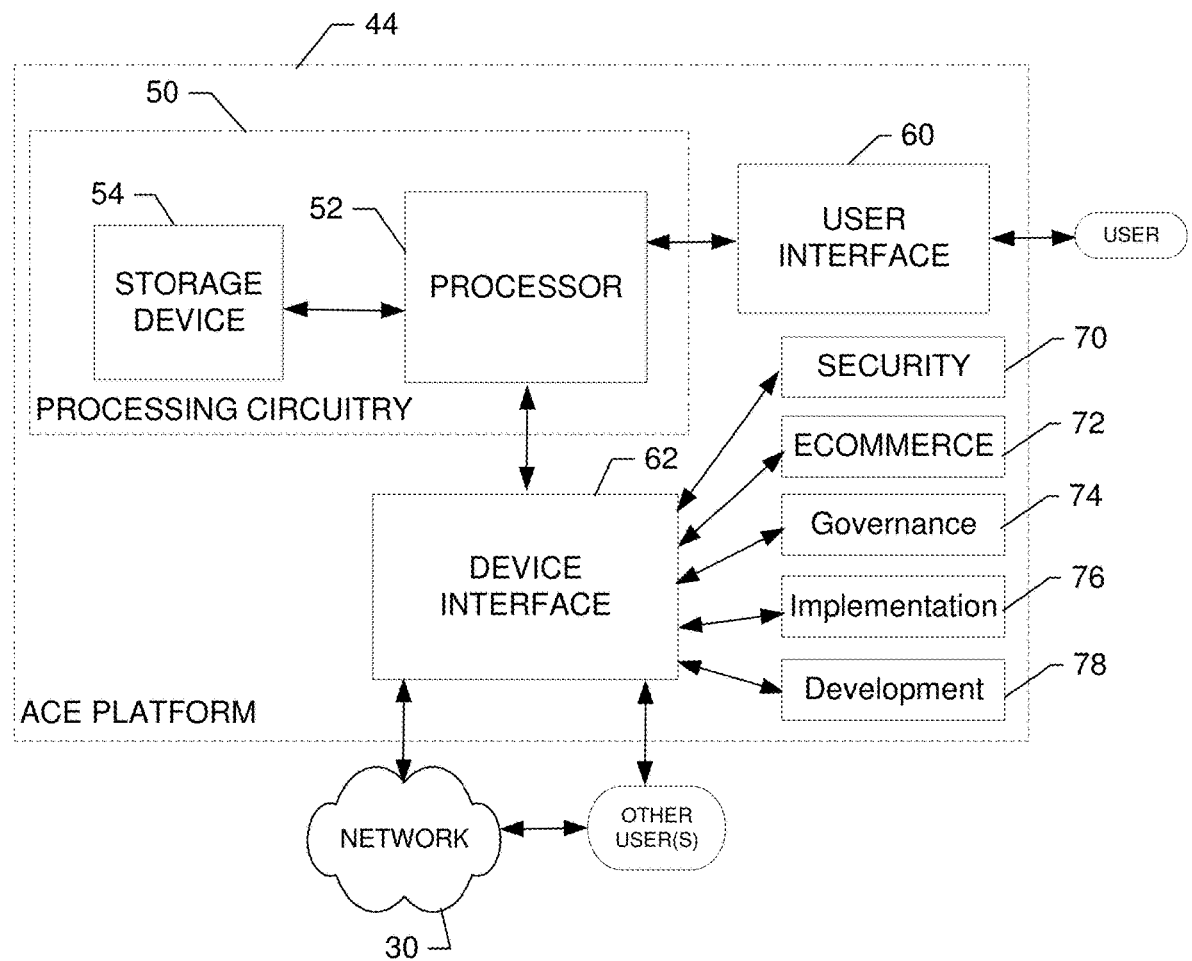
FIG. 2 illustrates a functional block diagram of an apparatus that may be useful in connection with providing exchange services according to an example embodiment.

An example embodiment of the invention will now be described with reference to FIG. 2. FIG. 2 shows certain elements of an apparatus for provision of the ACE platform 44 or other processing circuitry according to an example embodiment. The apparatus of FIG. 2 may be employed, for example, as the ACE platform 44 itself operating at, for example, a network device, server, proxy, or the like (e.g., the application server 40 of FIG. 1)). Alternatively, embodiments may be employed on a combination of devices (e.g., in distributed fashion on a client (e.g., any of the clients 20 of FIG. 1) or a variety of other devices). Accordingly, some embodiments of the present invention may be embodied wholly at a single device (e.g., the application server 40 or one or more clients 20) or by devices in a client/server relationship (e.g., the application server 40 and one or more clients 20). Thus, although FIG. 2 illustrates the ACE platform 44 as including the components shown, it should be appreciated that any of the clients 20 may include respective instances of the components shown in some cases. Furthermore, it should be noted that the devices or elements described below may not be mandatory and thus some may be omitted in certain embodiments.

Referring now to FIG. 2, an apparatus for provision of tools, services and/or the like for facilitating an exchange for information and services associated therewith in the aerospace industry is provided. The apparatus may be an embodiment of the ACE platform 44 or a device hosting the ACE platform 44. As such, configuration of the apparatus as described herein may transform the apparatus into the ACE platform 44. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, augmented/virtual reality device, electronic sensors, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network (e.g., network 30) and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the ACE platform 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the ACE platform 44 as described below.

The ACE platform 44 may be configured to include tools to facilitate the creation, consumption, use, management and distribution of aerospace information via the network 30. The tools may be provided in the form of various modules that may be instantiated by configuration of the processing circuitry 50. FIG. 2 illustrates some examples of modules that may be included in the ACE platform 44 and that may be individually configured to perform one or more of the individual tasks or functions generally attributable to the ACE platform 44 according to an example embodiment. However, the ACE platform 44 need not necessarily be modular. In cases where the ACE platform 44 employs modules, the modules may, for example, be configured to perform the tasks and functions described herein. In some embodiments, the ACE platform 44 and/or any modules comprising the ACE platform 44 may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the ACE platform 44 and/or any modules thereof, as described herein.

As shown in FIG. 2, the ACE platform 44 may include a security module 70. The security module 70 may be configured to enforce data security and data/user access control. In some example embodiments, the security module 70 may use authentication and authorization tools to manage the provision of access to users wishing to access the ACE platform 44, in some cases in real time and in other cases for controlling access to data in a non-real time environment. In some embodiments, the security module 70 may be configured to verify and seal every block of information transmitted over the network 30. Moreover, the security module 70 may be configured to ensure that information on the network cannot be changed, and is saved in a way that is transparent to all users so that the integrity of the information can be maintained. With the integrity of the information on the network 30 assured, companies can access, use, and distribute information while being sure that the information is authentic and is the same information accessible to all other users. In some embodiments, the security module 70 may be configured to use blockchain technology to achieve the integrity described above. The use of blockchain will be described in greater detail below.

The ACE platform 44 may also include an ecommerce module 72. The ecommerce module 72 may be configured to provide a marketplace for various applications or services that may be desirable by various entities using the ACE platform 44. For example, the ecommerce module 72 may provide an application programming interface (API) marketplace where authors may submit various APIs that have been developed for use with respect to data provided via the network 30. The APIs may be tailored to processing, analyzing, generating reports, or otherwise utilizing the data (i.e., aerospace or aviation data) in a way that may be beneficial to ACE members.

The ecommerce module 72 may also include tools for making and receiving digital payments. Thus, for example, any payments that may be due based on market defined pricing established using the ACE platform 44 may be processed directly on the ACE platform 44 between ACE members. Timely payment processing and clearing of transactions among ACE members may therefore be handled within the secure environment provided by the ACE platform 44.

In some example embodiments, the ACE platform 44 may also include a governance module 74. The governance module 74 may be configured to define or implement acceptance protocols and procedures for entities or parties wishing to become ACE members. Thus, for example, a party or entity may request membership to the ACE. The membership request may be in the form of an application or other communication that can be processed electronically via the ACE platform 44. In response to receipt of the request, management and governance information may be provided to the requesting party or entity and, upon acceptance of terms and conditions, membership may be granted. Upon granting of membership, the protocols for interface with the ACE platform 44 may be employed by the new member to access the ACE platform 44 in accordance with the management and governance information. Developer guidelines and any documentation needed to enable the new member to use the other modules (e.g., for application or API creation, ecommerce, and/or the like) may also be provided. In some cases, user reviews may be initiated of members responsive to completion of transactions with such members or responsive to receipt of data or services therefrom. The reviews may be communicated to members or used by governing bodies to provide feedback to members or discipline members as appropriate.

In some cases, the ACE platform 44 may also include an implementation module 76. The implementation module 76 may manage the architecture of the ACE platform 44 and provide various functional services associated with operation of the ACE platform 44. For example, the implementation module 76 may be configured to perform usage tracking, auditing and/or logging on an individual and/or member-wide basis. Thus, for specific members, usage by individuals associated with the member can be tracked, audited or logged and thereafter accessed by the member. Unique ID keys may be associated with individuals or data lines to facilitate such tracking, auditing or logging.

In an example embodiment, the implementation module 76 may also define a common protocol for management of the ACE platform 44. Thus, all protocols for communication and operation of the ACE platform 44 may be managed by the implementation module 76. The addition of data fields, management of search services, data trustworthiness verification, quality of service identification and other services may therefore be provided by the implementation module 76. The implementation module 76 may also be configured to handle ATG communication (e.g., via the link 31 that corresponds to a real-time ATG link) and ground-to-ground communication by any other links of the system 10. In some cases, the implementation module 76 may also provide language services such as, for example, allowing maintenance of client libraries in multiple languages so that one client associated with a particular location can provide content or services to other clients at other locations, even if such other locations generally are associated with speakers of languages different than the language of the particular location.

In some embodiments, the ACE platform 44 may further include a development module 78. The development module 78 may include development tools for defining APIs or applications for the marketplace maintained by the ecommerce module 72 as described above. Thus, for example, development tools that are configured to conform to the protocols of the ACE platform 44 may be provided by the development module 78. Moreover, the development module 78 may provide a developer sandbox, developer community support tools and testing infrastructure tools for the ACE platform 44.

In an example embodiment, the development module 78 may provide tools for expanding or implementing the capabilities of the other modules (70, 72, 74 and 76). Thus, for example, the development module 78 may be employed to define smart contracts that can expedite agreement between parties relative to data or services not specifically covered by virtue of participation in the exchange, and that further may use blockchain technology to support the administration and execution of said smart contracts. For example, if a particular transaction between parties becomes relatively commonplace, or is at least desirable to standardize in some way, the development module 78 may be used in cooperation with either or both of the ecommerce module 72 and the implementation module 76 (with security provided by the security module 70) to define one or more smart contracts that can be easily processed within the framework of the ACE platform 44 to expedite approval by all applicable parties. The contracts themselves may be stored for selection or modification before proposal to another party, and the contracts may be part of, or use functionality of, either or both of the ecommerce module 72 (e.g., for handling payments) and the implementation module 76 (e.g., for managing the processing of the approval process).

The ACE platform 44 may include members in a number of different areas that relate to the aerospace industry. Moreover, the members may be attracted to the ACE platform 44 precisely because of the ease by which members can interact with other members, or use data that is associated with the ACE, whether the data relates to the time before, during, in between, or after flights. Members may include entities or parties associated with flight operations, passenger services, airports, airport-based retailers, other retailers, advertisers, marketers, meteorology, data analytics, commercial airlines, travel agencies, aircraft manufacturers, aircraft MROs and OEMs, content providers and/or the like.

Figure 3:
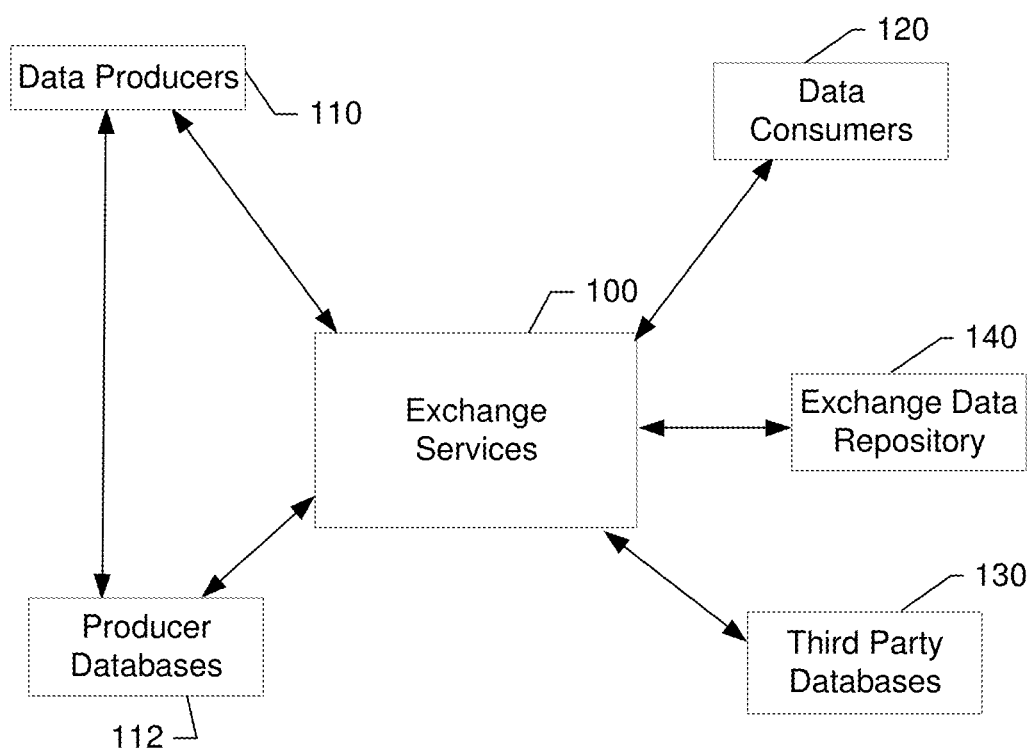
FIG. 3 illustrates a block diagram showing how exchange services may be provided in accordance with an example embodiment.

FIG. 3 illustrates a block diagram of a communication paradigm that is achievable using an example embodiment. Exchange services 100 may be provided (e.g., by the ACE platform 44) to members of the ACE. The members may include data producers 110 and data consumers 120. In some cases, the data producers 110 may store at least some of the data in producer databases 112. However, some of the data from data producers 110 may be provided in real-time (e.g., from aircraft in the air via the ATG links among links 31 of FIG. 1). Some data may also be provided from third party databases 130. Data provided either from the data producers 110 (directly or via the producer databases 112) or the third party databases 130 may be communicated directly or indirectly to the data consumers 120. In some cases, the data provided from the data producers 110 or third party databases 130 may be stored at an intermediate location prior to delivery to the data consumers 120. The intermediate location may be an exchange data repository 140 (e.g., an exchange data mart) that may store data that can be delivered upon request after such data was previously stored during real-time recording of such data or in block data uploads from the producer databases 112 or the third party databases 130. This may enable data consumers to make use of historical data.

In some embodiments, information for the data producers 110 may be provided in real-time from an aircraft. Thus, for example, a "smart cookie" descriptive of the actual current location of the aircraft or its destination may be useful for provision to data consumers 120 so that any services offered to individuals on the aircraft may be properly targeted to the individuals and tailor their internet/web browsing experience to each unique person. Other feeds into the system may include GPS data, GPS time, ADS-B (automatic dependent surveillance-broadcast), SWIM (system wide information management) and numerous other safety related, or non-safety related information streams or pieces.

The producer databases 112 and the third party databases 130 may be external to the network 30, but the exchange data repository 140 may be internal to the network 30. However, other architectures are also possible. In some cases, the data producers 110 may transmit data to be used for exchange services 100 in real-time or near real-time for immediate distribution to the data consumers 120 or for storage at the exchange data repository 140. Alternatively, such data may be communicated post hoc, either after landing (directly from the aircraft) or from the producer databases 112 (which may receive the data in real-time or after the fact as well). Data from the data producers 110 may also find its way to the producer databases 112 via the exchange services 100 in embodiments where the producer databases 112 are part of the exchange. Queries for data to be provided by the exchange services 100 may be provided from the producer databases 112 (e.g., requesting transmission of data thereto), from the exchange data repository 140 (e.g., requesting transmission of data for storage thereat), or from data consumers 120. The data consumers 120 may request data retrieval to access the data for their own uses, or may request various insights, applications, or other services that are generated and accessible from the exchange services 100.

In order to provide the communication paradigm described in reference to FIG. 3, the security module 70 of FIG. 2 may be used to manage the security of the information transfers that are supported by the ACE platform 44. Security can be provided by managing the network 30 as a centralized network, or as a distributed network. In instances in which the network 30 is managed as a centralized network, integrity management may be centrally managed by the security module 70 for the network 30. The network 30 may use a typical communication protocol associated with provision of web services (e.g., HTTPS/REST). Applications may be executed using virtually any language and runtime environment, and client authentication may be accomplished using cryptographic keys.

For a distributed network structure, the security module 70 may be configured to employ a blockchain-specific wire protocol. Integrity management would be accomplished in a distributed fashion in which all components of the network act as a database having network protocols that are distributed and decentralized, but which allow all information to be stored in blocks having a transparent and trackable history that is verified and sealed by the protocol itself. Client authentication may still be accomplished using cryptographic keys, but a number of applications may be uniquely crafted (e.g., smart contracts) to take advantage of the use of blockchain technology. The employment of blockchain technology is described in greater detail in reference to FIGS. 4 and 5 below.

As mentioned above, the ACE platform 44 allows members to have access to the data of other members for the development of useful applications or APIs, and for the facilitation of information exchange and use without requiring individual entities to work out specific contracts or partnerships. In this regard, by agreeing to become a member, each member may further agree to either provide a specific set of information (e.g., if the member is a data producer) or agree to a specific predefined set of limitations on the use of data received (e.g., if the member is a data consumer). In some cases, the information and/or services or content exchanged via the ACE platform 44 may also be subject to prior agreements or governance restrictions as to format, protocol, confidentiality requirements and/or the like. Thus, for example, the ecommerce module 72, the implementation module 76 and the development module 78 may each have tools that conform to the prior agreements and allow processing of data and/or provision of services based on such data to be provided in a manner that is both usable by other members and also allows any applicable service charges to be applied and handled via the ACE platform 44 as well.

Example embodiments may enable a whole new set of services to be provided using various data generation, data processing and distribution entities that may be users of the ACE platform 44. For example, an aircraft routing (i.e., flight path) service may be a member. The aircraft routing service may act as both a data producer and a data consumer with respect to generation of routing services. In such an example, the aircraft routing service may be one instance of the clients 20 shown in FIG. 1. The aircraft routing service may run an aircraft routing application that is one instance of the client applications 22 of FIG. 1. The aircraft routing application may be a data consumer with respect to real-time position information provided by a plurality of aircraft (i.e., data producers 110). The aircraft routing application may also receive weather information from third party databases 130 that might include arrival airport landing conditions, ground traffic, gate availability, crew availability, and could also incorporate turbulence or weather information (in real-time) from the aircraft, from other aircraft, or from other information services. Based on the trajectories of the aircraft, and the weather and/or turbulence information (e.g., via pilot reports (PIREPs)), the aircraft routing application may provide a computation for rerouting of the aircraft. As such, the aircraft routing application may (e.g., in real-time) send a rerouting option to the aircraft (thereby acting as a data producer with respect to the aircraft). The aircraft may receive the rerouting option and request approval from air traffic control to employ the rerouting option.

Within the context of the example described above, the aircraft may use the ATG or satellite links or any other wireless link with which an aircraft may be associated (e.g., air-to-sea links or air-to-air links) described above to provide real-time or near real-time data to and from the aircraft routing service and one or both entities may pay an agreed to rate with the network service provider for the corresponding data services. The exchange services 100 of the ACE platform 44 may enable tracking of the data used for billing purposes, and may use the ecommerce module 72 to handle such billing. The data obtained from the third party databases 130 (if any) may also be charged using the ecommerce module 72. Meanwhile, the aircraft routing service itself may have been developed or integrated into the system (at least in part) using the development module 78. Charges associated with the services provided to the aircraft (or air traffic control) may also be handled via the ecommerce module 72. Auditing, tracking and/or logging of information may be managed by the implementation module 76, and such information may be provided to the ecommerce module 72 to facilitate billing. Meanwhile, all of the security for all communications may be managed by the security module 70.

In some example embodiments, the exchange services 100 may include a service dedicated to maintenance of an electronic aircraft record. The electronic aircraft record may be a record maintained to include information associated with the history of a particular aircraft. The electronic aircraft record may be maintained in either a centralized or distributed fashion as one of the exchange services 100 under the communication paradigm shown in FIG. 3. As such, the electronic aircraft record may be stored (e.g., in the exchange data repository 140 or another location) and maintained based on the communication paths shown in FIG. 3.

As such, the electronic aircraft record may be maintained electronically, and may be maintained on the basis of inputs provided from a plurality of different sources (e.g., members and third parties). In an example embodiment, the electronic aircraft record may be maintained by one of the data consumers 120 as part of the exchange services 100. The data consumer 120 that maintains the electronic aircraft record may receive input from the data producers 110 (e.g., in real-time or post hoc), from producer databases 112, third party databases 130, and/or the exchange data repository 140 to update the electronic aircraft record. In some cases, each update may be verified for authenticity. In embodiments that practice centralized control (e.g., a centralized network), the verification may be made by ensuring that each party providing information is authenticated. In embodiments that practice distributed control (e.g., a distributed network), blockchain may be employed for authentication of each information entry to the electronic aircraft record. As such, blockchain may be used in some cases for the assured delivery of data (e.g., without regard to path), and for the assurance of the authenticity of the data delivered. By assuring delivery (e.g., using blockchain), safety related traffic data can be transmitted over non-safety-specific channels.

In some embodiments, the electronic aircraft record may include a plurality of different portions associated with corresponding different types of information about the aircraft. In some examples, one of the portions of the electronic aircraft record may be an aircraft maintenance record portion. The aircraft maintenance record portion may record data regarding the total time in service of aircraft components (e.g., the airframe, engine, propellers, rotors, appliances, etc. of the aircraft) and any major alterations to such components. Thus, the aircraft maintenance record portion may effectively be a record of the maintenance history of the aircraft. The current status of each of the aircraft components including the time since the last overhaul of various components may also be recorded in the aircraft maintenance record portion. The aircraft maintenance record portion may also include information indicative of the inspection status of the aircraft and any components requiring inspection. The aircraft maintenance record portion may include data partially or entirely provided by an external program associated with a member or a third party, or the aircraft maintenance record portion may include data that is partially or entirely provided as one of the exchange services 100 (i.e., using software or programs that are provided for member usage via the network 30). Combinations of the above methods of receiving data may also be employed. Moreover, individual authorized and authenticated actors may submit data for inclusion in the aircraft maintenance record portion when such actors have been properly identified and credentialed.

In some cases, the aircraft maintenance record portion may itself further include portions dedicated to individual components or systems of the aircraft. For example, the aircraft maintenance record portion may include an engine portion dedicated to recording activity associated with the engine, an airframe portion dedicated to recording activity associated with the airframe, and various other portions dedicated to recording activity associated with such corresponding portions. These portions could, in some cases, be individually maintained records in and of themselves. Similarly, the aircraft maintenance record portion may be a separate record from the other portions. As such, for example, the electronic aircraft record may be a single record or a collection of individual records.

When data is stored in the aircraft maintenance record portion, regardless of its origin, the data may be in a format that is both known and accessible to other members for use in application development, research, service provision and/ or the like. Access to some data may be free and open to all, while access to other data may be restricted amongst the membership. For example, de-identified data may be accessible to any member at any time. However, data that is not de-identified may only be accessible if the owner of such data grants permission for access. Aircraft maintenance data may be de-identified so that the specific aircraft to which the data applies is not necessarily known. De-identified data may be stripped of individual identification information, or may be aggregated to ensure that the identities of individual aircraft are not determinable. De-identified data may be useful for application developers and researchers, while preserving the privacy of individual aircraft owners/operators.

In an example embodiment, de-identified data may be stored in the exchange data repository 140 for access to members through the exchange services 100. The implementation module 76 may handle the data and access thereto. However, if there are any costs or charges to be applied to grant access to such data, then the ecommerce module 72 may be employed to handle such transactions. Meanwhile, as in all cases, the security module 70 may ensure that the proper authorizations and authentications are received to identify a requesting party as a member authorized to receive any data requested. After the data is provided, if desired, the development module 78 may be employed along with application development tools provided therein to develop applications that use the data. The applications developed may include, for example, new tools for managing the aircraft maintenance record portion, in which case such tools may become part of the exchange services 100 accessible to members.

Another portion of the electronic aircraft record may be an aircraft logbook portion. The aircraft logbook portion may store information indicative of routes traveled, schedule information, crew information for the aircraft (e.g., pilot in command), number of landings, location, time and data of takeoff and landings, and/or the like. The aircraft logbook portion may effectively be a record of the operational history of the aircraft from an event-based perspective or it can be a living logbook, recording as many parameters as desired in an ongoing or periodic fashion. In some cases, the electronic aircraft record may also include an environmental data recording portion, which further records operational history information of the aircraft with respect to various environmental conditions in and around the aircraft from a timeline perspective and can be correlated, automatically or on demand, with various official logbook entries as needed. A sensor network deployed throughout the aircraft may gather environmental data to be recorded at the environmental data recording portion. As with the aircraft maintenance record portion above, data associated with the environmental data recording portion and/or the aircraft logbook portion may each be either de-identified prior to provision to other members, or (e.g., when an agreement between members dictates, or when the data producer allows) data that has not been de-identified may be shared via the exchange services 100.

Providing input to the electronic aircraft record under a centralized network paradigm may be accomplished under the control of one or more instances of the processing circuitry 50 of FIG. 2, acting as a centralized control for all aspects of control of the electronic aircraft record. However, as discussed above, some example embodiments may employ blockchain technologies in a distributed fashion. In such examples, the electronic aircraft record may effectively be a distributed leger based data model for maintaining and authenticating aircraft data. In such an embodiment, the electronic aircraft record may effectively be maintained in a distributed fashion by multiple parties, none of whom own the full record and without any single intermediary to collect and maintain the data. Thus, not only could blockchain be used with respect to communications conducted over the ACE platform 44 generally, but blockchain could also (or alternatively) be used to manage the maintenance of individual records (e.g., the electronic aircraft record) that are exchangeable via the ACE platform 44. Moreover, as will be discussed in greater detail below, data associated with individual platforms may also be managed using blockchain.

Accordingly, in some example embodiments, a blockchain-based consensus framework may be used at multiple levels within the ecosystem created by the ACE platform 44. In this regard, for example, data generated by individual members, actors or assets (e.g., individual aircraft or organizations) within the ecosystem may employ blockchain to maintain a record regarding specific types of data or information shared within the system 10. Thereafter, at a higher level, a specific record (e.g., the electronic aircraft record) that may be communicated or exchanged on the platform itself (i.e., on the ACE platform 44) may rely on blockchain.

Figure 4:
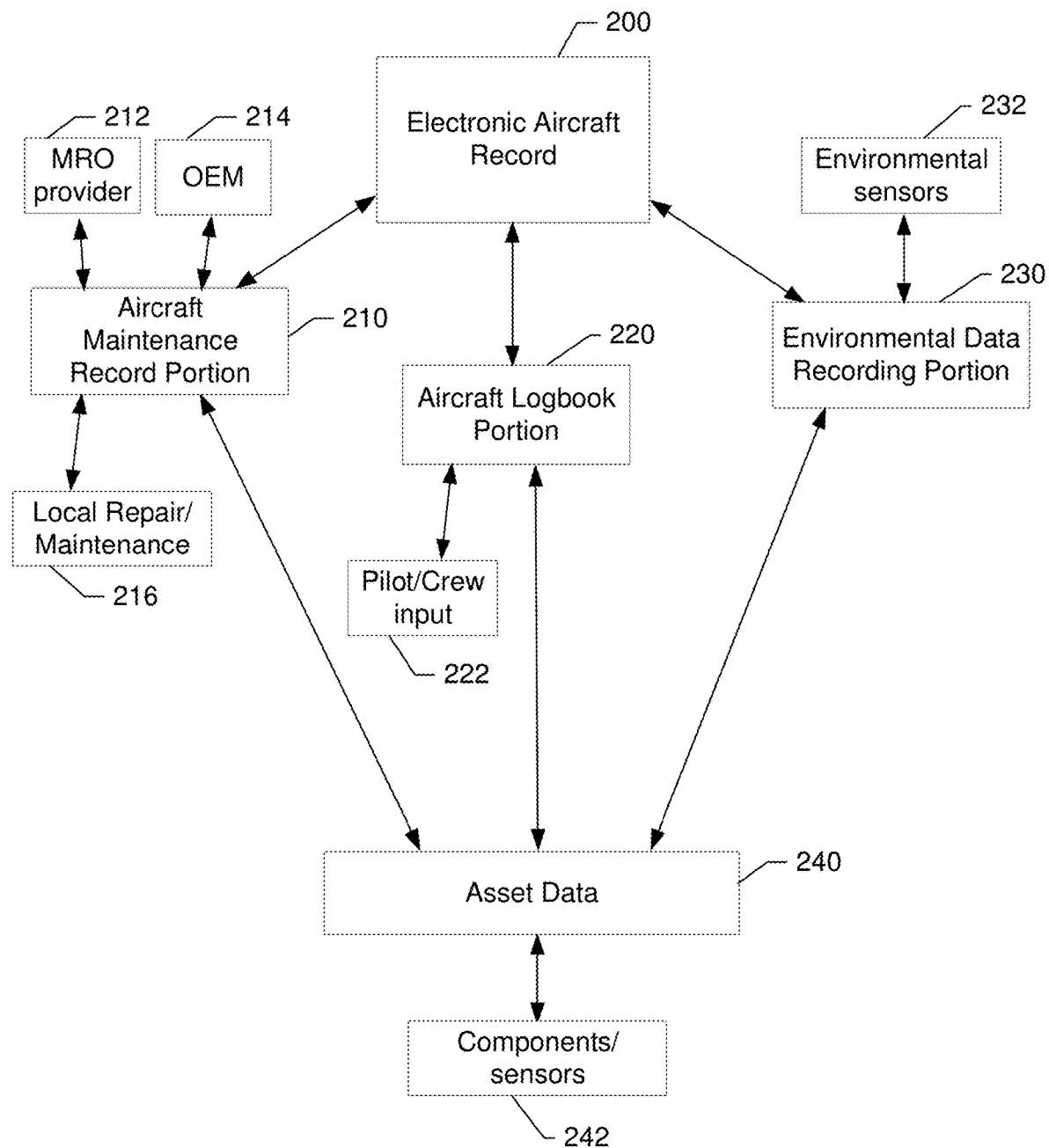
FIG. 4 illustrates a functional block diagram of one particular exchange service, i.e., maintaining an electronic aircraft record, in accordance with an example embodiment.

FIG. 4 illustrates a block diagram of a multi-level implementation of blockchain within an example embodiment. As shown in FIG. 4, An electronic aircraft record 200 may be maintained in a distributed fashion by employing a permissioned or permissionless blockchain implementation with multiple participants or actors being capable of providing authentic changes to a distributed ledger (i.e., the electronic aircraft record 200). Although the actors are shown interacting with specific portions of the electronic aircraft record 200 (e.g., the portions described above), such portions need not necessarily be separate in all implementations.

As shown in FIG. 4, an aircraft maintenance record portion 210 may have various inputs provided thereto from MRO providers 212, OEM 214, and local repair or maintenance facilities 216 either in the form of individual actors at such organizations, or by a common account associated with such organizations. Each change to the aircraft maintenance record portion 210, and thereby also to the electronic aircraft record 200, may be made based on a blockchain consensus framework established so that every entry is authenticated before entry inti the record (or record portion) is allowed. Once the entry is made, its authenticity can be assumed to be proven and immutable.

An aircraft logbook portion 220 may also be provided in the manner described above. Any entry submitted by a pilot, owner, operator, crew member, or via IoT, by the aircraft parts themselves, etc. (e.g., pilot/crew input 222) may be authenticated before entry into the record (or record portion) is allowed. Thereafter, all such entries are again assumed to be proven and immutable. Similarly, the environmental data recording portion 230 may receive individual inputs from a sensor network of environmental sensors 232 (e.g., aircraft sensors detecting pressure, velocity, altitude, heading, airspeed, etc.). As discussed above, each of the portions may be a record in its own right, or may be portions of a single record. In cases where the "portions" are actually individual records, blockchain may be practiced at a first level to maintain each record, and then again at a second level to ensure the authenticity of the larger record (i.e., the electronic aircraft record 200).

In some example embodiments, some or even each of the portions of the electronic aircraft record 200 (i.e., the aircraft maintenance record portion 210, the aircraft logbook portion 220 and the environmental data recording portion 230) may receive asset data 240 directly from the asset (e.g., the aircraft) with which the record is associated. In such an example, components/sensors 242 on the aircraft (or asset) may all report to a central location regarding their respective statuses, conditions, or other data measured at the components/sensors 242. Each component/sensor 242 may communicate using blockchain to ensure that the record of asset data 240 is filled with authentic data. Moreover, in some cases, the electronic aircraft record 200 (or portions thereof) may be maintained remote from the aircraft, but at least some of the data used for maintaining the electronic aircraft record 200 (or portions thereof) may be provided in real-time via the one of the links 31 that is a real-time ATG link. Thus, one need not wait until the aircraft is on the ground, at the gate, in the hanger, or in a repair facility to offload data associated with individual components or sensors. Instead, asset data 240 can be modified (e.g., using the security of blockchain) in real time, while the aircraft is still in the air.

In the context of FIG. 4, some example embodiments may allow pilots, crew, maintenance personnel, and/or the like to add data to a blockchain data store. The data added may be validated prior to encoding on a blockchain by any available method. Moreover, the entry of data onto a blockchain node may be accomplished by any suitable party in any suitable way. In some cases, example embodiments could be implemented in what is effectively a multi-network structure. The first network may be a traditional client-server designed network for clients that do not participate as a blockchain participant node. The second network would be the blockchain network itself. In such an example, the first network may query a node on the second network, where the node on the second network looks at the blockchain data and returns the information. Alternatively, the first network may expose an API that allows data to be added to the blockchain network.

As one example implementation of blockchain relative to activities associated with the ACE platform 44, a transaction ledger could be created for trading loyalty points (e.g., frequent flier miles, or other loyalty programs) for goods and services while in-flight. In this regard, it is currently difficult and opaque for airline vendors to get paid for services when passengers trade in airline miles. If the ACE platform 44 is configured to employ blockchain techniques, the ACE platform 44 could essentially provide a reliable exchange service to enable loyalty programs to conduct transactions with consumers in-flight and in real time. Buffering of communications may be included in some cases where there is no advantage to having real time information exchanges. However, the in-flight, real time aspect may be advantageous to some use cases. The ACE platform 44 may include a loyalty program module configured to allow participants define appropriate conversion requirements or other data to enable their respective loyalty points (i.e., their currency) to be valued in the exchange by other exchange members in a way that is agreeable to all exchange members. As such, for example, a consumer on a flight could use airline miles to purchase drinks, entertainment or other services (including products sold or offered for sale via the exchange) even if the services or goods provided are not associated with the loyalty program for which the corresponding points are used as currency. The ACE platform 44 may therefore not only enable an in-flight consumer to engage in various types of commerce with the exchange members in-flight, but the exchange members could each get appropriate compensation from each other in real time. A second example implementation of blockchain relative to activities associated with the ACE platform 44, involves a transaction ledger, in a context where real time connectivity is provided to consumers in-flight, whereby once the consumer connects to the ACE platform 44, it may immediately be known that the consumer is on the flight and the reward points associated with the flight may instantly be awarded to the consumer and available for purchasing goods and services on the same flight for which the award points were awarded. Thus, the ACE platform 44 may enable instant redemption in-flight and employing blockchain may further provide a transaction ledger that is also maintained in real time in order to allow funds, credits, etc., to be passed between parties involved in transactions (i.e., exchange members) without concern for intrusion from third parties and with full confidence in the authenticity of transactions occurring via the ACE platform 44. Thus, devices (e.g., personal communication devices such as laptops, smartphones, etc., and servers or ground based computer terminals) both on the ground and in-flight may communicate with each other via the ACE platform 44 to exchange in commerce in a unique environment that may, in some cases, take advantage of blockchain technology. In this regard, all such devices may be on the ground, in the air, or split between the ground and the air in various example embodiments and still leverage the ACE platform 44 and the associated APIs thereof.

Figure 5:
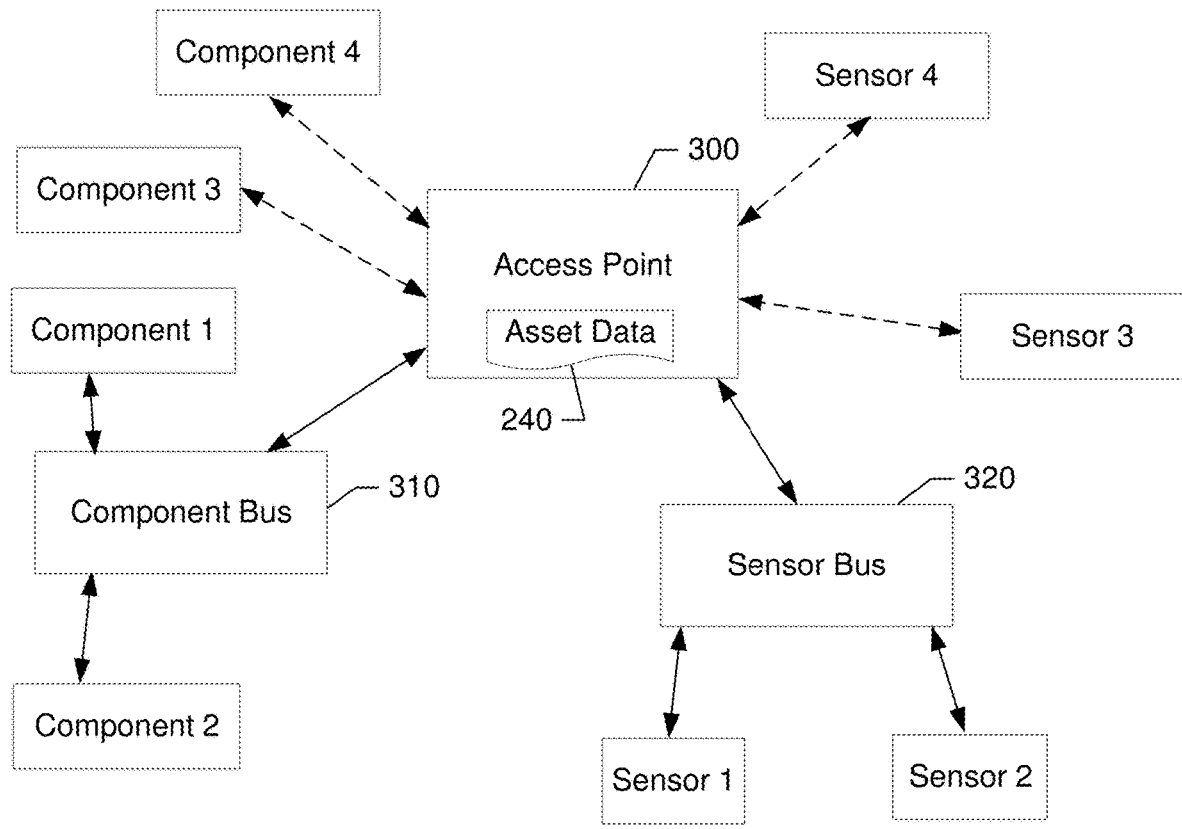
FIG. 5 illustrates a functional block diagram of one level of activity associated with performance of an exchange service in accordance with an example embodiment.

FIG. 5 illustrates a block diagram of a communication environment on an aircraft configured to generate authenticated asset data 240 in accordance with an example embodiment. As shown in FIG. 5, a plurality of components (e.g., component 1 and component 2) may be operably coupled to an access point 300 (or other data aggregation module or processing/communication device) that may either directly or indirectly communicate the asset data 240 to other components as shown in FIG. 4 via a component bus 310. The component bus 310 may be a single data wire or a collection of data wires to carry component data from the components (1 and 2) to the access point 300. The access point may also be operably coupled to some components (e.g., component 3 and component 4) wirelessly. Components 3 and 4 may each have radio, antennas and/or other wireless coupling devices to enable wireless communication with the access point 300, or the components 3 and 4 could alternatively have wireless communication equipment operably coupled thereto to relay information to the access point 300. In either case, the access point 300 may be receive data from each of the components (1-4) and process, translate, aggregate or otherwise prepare such data for further communication as the asset data 240.

Similarly, sensor 1 and sensor 2 may be operably coupled to the access point 300 via a sensor bus 320, which may be the same or different from the component bus 310. Meanwhile, other sensors (e.g., sensor 3 and sensor 4) may be operably coupled to the access point 300 wirelessly in a manner similar to that described above for components 3 and 4. After reaching the access point 300, data provided to the access point 300 from any of the sensors (1-4) may be further provided as asset data 240 for inclusion in the electronic aircraft record 200 (or portions thereof).

In an example embodiment, data received from any of the sensors (1-4) or components (1-4) may be provided via blockchain to define the asset data 240. Thereafter, the asset data 240 may be provided as a record of data where each piece of data is authenticated using blockchain techniques. The record (i.e., the asset data 240) can then be accepted as authentic since each piece of data used to populate the record is known to be authentic. Furthermore, in some cases, each component or sensor that is added to the system may initially communicate and authenticate itself to the access point 300. For example, component 1 may be replaced with a new component 1 having a particular identification (e.g., part number). The new component 1 may be installed into the component bus 310 and immediately register with the access point 300. Thereafter, as a registered component, the new component 1 may report its data using blockchain techniques and make use of data using blockchain techniques. The data reported may be reported in association with the particular identification of the new component 1. Sensors may operate similarly. Accordingly, the data gathered by each sensor or component may be recorded in association with the part number or other identification of the component or sensor. If a component fails to report data, or provides improper data, the component may be identifiable as needing investigation to determine whether a fault exists. Furthermore, data regarding each component may be recorded and provided (e.g., in real-time) via an ATG communication link as a wireless, real-time flight data recorder for activities of each component of the aircraft that is monitored for reporting of the asset data 240.

In other words, the aircraft, which is made up of many discrete parts that may be intelligent (colloquially referred to as the Internet of Things (IoT)) effectively can have an internal blockchain within the aircraft, which can be used to ensure an accurate aircraft parts and health record is maintained with impeccable traceability. This could go so far as to working with the aircraft systems in such a way as to only use input from a part if it is considered an accepted part of the aircraft itself, as recognized by each part of the aircraft which make up the distributed nodes of the on-aircraft blockchain. It should be appreciated that a 'part' in the context of an aircraft can mean more than just an obvious physical element of the aircraft, but also can refer to software or firmware. This can ensure that parts control is maintained inflight, thus preventing hackers from attempting to insert malicious code (which by definition would not validate/authenticate on the aircraft's internal blockchain). Thus, this may be an example of how internal blockchain may be used to implement the living logbook discussed above.

Accordingly, blockchain can be implemented at multiple levels and in multiple different or distinct ways within the system 10. In this regard, blockchain may be employed for maintaining specific ledgers or records that can be shared via the ACE platform 44 (e.g., the electronic aircraft record 200 (or portions thereof), and blockchain may be used to ensure that entries to the specific ledgers or records from specific entities outside the ACE platform 44 (e.g., individual aircraft or facilities) are authenticated prior to being allowed for entry onto the ACE platform 44. Blockchain may also be employed to allow management of smart contracts on the ACE platform 44 and other exchanged data and services on the ACE platform 44.

For example, the aircraft may have multiple operational devices (Electronic Flight Bags or EFBs, many of which are now tablets like iPads or Surface Pros) in addition to the physical parts of the aircraft. In an example embodiment, each device that is supposed to be on the internal network of the aircraft for the duration of a particular flight may registers itself to the internal network, in advance of the flight, as part of the pre-flight process. As part of the registration, pilots or crew members may login to their EFBs or other smart devices to unlock them (e.g., via password, biometric, etc.), but also log them in or otherwise authenticate and register the devices to the internal network via any suitable authentication/registration means. In some cases, a unique service set identifier (SSID) that is accessible only by the crew/pilots may be used for registration. The internal network of the aircraft could then 'register' those devices as authorized EFBs for the aircraft for the flight. Moreover, in some cases, each external device (e.g., personally owned device) may need to be accepted or recognized by other devices in the network, so that each accepted device is a known device of crew members/pilots on the flight, and is recognized as such. All this information may then be put into a dynamic blockchain authentication key internal to the aircraft, and could register this with the ACE/outside world if and when connectivity is or becomes available. Thus, even personally owned devices could become part of the authenticated internal network of the aircraft for a limited period of time (i.e., a single flight). Accordingly, "dynamic blockchain" or "dynamic group blockchain" techniques may be used to temporarily add even personally owned devices to a trusted internal network of an aircraft and then further register such devices to an external network for a limited period of time (one flight) via the procedure.

The blockchain authentication authorization may include each device and the aircraft (e.g., parts and software/hardware) combined, in essence creating a combination key to say indicate that the respective devices are authorized. The combination key could then be registered with the ground (e.g., with the ACE), adding another layer to the combination (and possibly include device validation checks to ensure that the devices match the assigned crewmembers and aircraft). This external dynamic group blockchain ensures that anything that goes up to the aircraft from the ground also needs to possess the dynamic key in order to be deemed valid information.

If a hacker attempts to interject himself/herself, the hacker would clearly not have the combination key since the hacker was not part of the group of devices that formed the combination key prior to the flight whether the hacker attempts to infiltrate from on the aircraft or off the aircraft. At the end of the flight, the dynamic blockchain for the flight may be dissolved, so the dynamic blockchain is temporally limited (e.g., to a particular flight). Thus, even if hacker steals a device that a crew member previously used, and is able to unlock the device, the hacker can still not use the device to infiltrate the internal network on another flight. The other flight would have a different combination key unknown to the hacker and to the device that was previously used as part of the internal network of the aircraft on a prior flight. Moreover, the hacker's device may not be accepted in a situation where, for example, new devices must be accepted by existing devices on the network. For example, at least 2 (or a majority) of the other devices on the flight may need to vote to accept any new device seeking entry into the internal network in order to issue the combination key for the flight to the new device.

Based on the descriptions of FIGS. 4 and 5, it should be appreciated that the status of individual components or parts can be determined in real-time (e.g., while the aircraft is in the air) or historically, as needed. The proactive or reactive ordering of replacement parts/components, or the ordering of maintenance, whether reactive, preventive, or predictive, on such parts/components may then be scheduled or handled while the aircraft is still in the air. The ordering and deliver of the part can then be coordinated with the location and schedule of the aircraft to maximize availability of the aircraft. Trusted parts can be identified and installed on the aircraft. Moreover, such parts can authenticate themselves to the aircraft (or access point) upon installation using the on-aircraft blockchain, which itself can then authenticate with an off-aircraft blockchain, providing for further data integrity.

Figure 6:
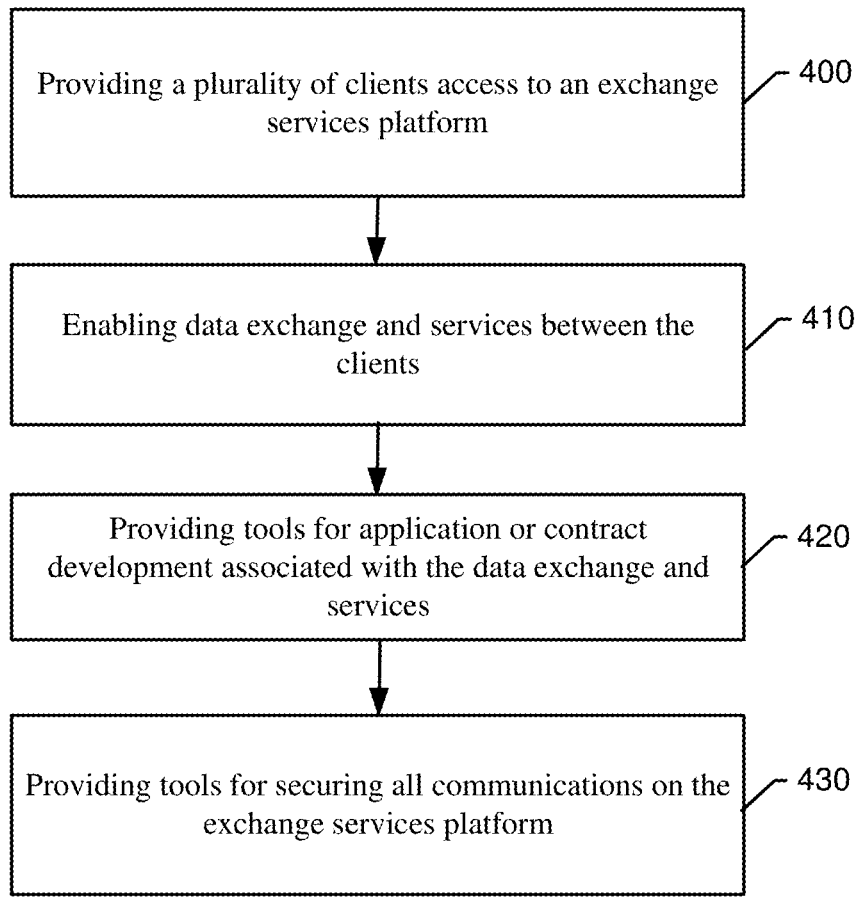
FIG. 6 illustrates a method for providing exchange services in accordance with an example embodiment.

From a technical perspective, the ACE platform 44 described above may be used to support some or all of the operations described above. As such, the platform described in FIG. 2 may be used to facilitate the implementation of several computer program and/or network communication based interactions. As an example, FIG. 6 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention is shown in FIG. 6. The method may include providing a plurality of clients access to an exchange services platform at operation 400. The provision of access may be based upon each client becoming a member of the exchange, or otherwise agreeing to terms and conditions for participation in the exchange. The terms and conditions may include policies for the sharing of data with other members/parties and, in some cases, defining formats for sharing such data. The method may further include enabling data exchange and services between the clients at operation 410. It should be appreciated that the clients may, each and of themselves, be a platform in their own right which connects to other sources of data. Thus, the exchange in that sense is a platform of platforms. The exchange of services and data may be coordinated in a way that allows at least some transactions to be handled via the exchange services platform without separate need for agreements or one-on-one negotiations amongst the parties. The method may also include providing tools for application or contract development associated with the exchange of data and services at operation 420. Thus, even to the extent the parties do wish to make special agreements associated with the services or data, tools are provided on the exchange to allow the parties to generate and process the contracts in an abbreviated way. Such smart contracts may rapidly accelerate the ability to come to agreement for services related to the exchange. The method may further include providing tools for securing all communications on the exchange services platform 430. The tools may include using blockchain techniques or other centralized security techniques.

In an example embodiment, an apparatus for performing the method of FIG. 6 above may comprise a processor (e.g., the processor 52) or processing circuitry configured to perform some or each of the operations (400-430) described above. The processor may, for example, be configured to perform the operations (400-430) by performing hardware implemented logical functions, executing stored instructions, or executing algorithms for performing each of the operations. In some embodiments, the processor or processing circuitry may be further configured for additional operations or optional modifications to operations 400 to 430.

In some example embodiments, an aerospace commerce exchange system may be provided. The system may include a network, a plurality of clients operably coupled to the network, and an aerospace commerce exchange platform operably coupled to the network to provide exchange services to the clients. At least one of the clients may be operably coupled to the aerospace commerce exchange platform via a real-time, air-to-ground wireless communication link to provide or receive data associated with at least one of the exchange services.

In some embodiments, the system (and a corresponding apparatus configured to perform the operations that distinguish the system) may include (or be configured to perform) additional components/modules, optional operations, and/or the components/operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, at least one of the clients may include an aircraft. The aircraft may provide data from components or sensors of the aircraft to the aerospace commerce exchange platform. The at least one of the exchange services may include providing an electronic aircraft record. In an example embodiment, the electronic aircraft record comprises an aircraft maintenance record portion, an aircraft logbook portion or an environmental data recording portion. In such examples, one or more of the aircraft maintenance record portion, the aircraft logbook portion and the environmental data recording portion include asset data provided in real-time from the components or sensors of the aircraft. In some cases, the electronic aircraft record may include a database or ledger maintained using blockchain techniques. In an example embodiment, the aerospace commerce exchange platform may include a development module configured to enable a first client to use data provided from a second client to create a tool accessible via the network for use as one of the exchange services. Additionally or alternatively, the aerospace commerce exchange platform may include an ecommerce module configured to enable a first client to conduct a transaction with a second client as one of the exchange services for which billing is handled via the aerospace commerce exchange platform. In such an example, the aerospace commerce exchange platform may include a security module configured to enable secure communication associated with the exchange services between the clients. In some cases, the security module may include processing circuitry at a centralized location in the network to manage authorization or authentication of the communication. Additionally or alternatively, the security module may include distributed processing circuitry associated with management of authorization or authentication of the communication. In such an example, the distributed processing circuitry may employ blockchain techniques. In some example embodiments, blockchain techniques may be employed at multiple levels within the system. In some cases, asset data may be provided in real-time from the aircraft and the asset data is provided via an asset data record maintained using the blockchain techniques. Additionally or alternatively, the exchange services may include at least one service associated with the asset data record, and multiple clients may communicate with each other to perform the at least one service employing blockchain techniques. Additionally or alternatively, a plurality of components or sensors of the aircraft may be operably coupled to an access point wirelessly or via a bus. In such an example, the components or sensors of the aircraft may each be authenticated to the access point prior to communication with the access point such that data from the components or sensors is associated with each respective one of the components or sensors from which the data originated. In an example embodiment, smart contracts may be provided as one of the exchange services.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An aerospace commerce exchange system comprising:
an air-to-ground wireless communication network;
a plurality of clients operably coupled to the network, the clients comprising data producers and data consumers;
an aerospace commerce exchange platform operably coupled to the network to provide exchange services to the data producers and the data consumers such that the data producers provide information to the aerospace commerce exchange platform to be accessed by the data consumers; and
a security module configured to enable secure communication associated with the exchange services between the clients,
wherein at least one of the data producers comprises an in-flight aircraft that is operably coupled to the aerospace commerce exchange platform via an air-to-ground wireless communication link to provide the information as data from components or sensors of the aircraft to the aerospace commerce exchange platform while the aircraft is in-flight,
wherein the aerospace commerce exchange platform comprises a development module configured to enable one of the data consumers to use the information provided from the aircraft to create a tool accessible via the network for use as one of the exchange services, wherein the security module is configured to provide a distributed ledger for communication of the data from the components or sensor of the aircraft as an aircraft record for the aircraft, and from components or sensors of multiple other in-flight aircraft as respective aircraft records for the other in-flight aircraft, and wherein the data from the components or sensors of each of the aircraft and the other in-flight aircraft define a first level at which permissioned or permissionless blockchain techniques are employed to ensure authentication of the data, and wherein permissioned or permissionless blockchain techniques are further employed at a second level to ensure authentication of the aircraft record and the respective aircraft records for the other in-flight aircraft.

2. The system of claim 1, wherein the at least one of the exchange services comprises providing the aircraft record and the respective aircraft records for the other in-flight aircraft to the data consumers to enable application development by the data consumers based on the aircraft record and the respective aircraft records for the other in-flight aircraft.

3. The system of claim 2, wherein the aircraft record and the respective aircraft records for the other in-flight aircraft each comprise an aircraft maintenance record portion, an aircraft logbook portion or an environmental data recording portion.

4. The system of claim 3, wherein one or more of the aircraft maintenance record portion, the aircraft logbook portion and the environmental data recording portion include asset data provided in real-time from the components or sensors of the aircraft and the other in-flight aircraft.

5. The system of claim 3, wherein the aircraft record and the respective aircraft records for the other in-flight aircraft each comprise a database or ledger maintained using blockchain techniques.

6. The system of claim 1, wherein a pilot of the aircraft and maintenance personnel are each authorized to add data to a blockchain data store comprising information associated with maintenance of the aircraft that is protected via blockchain techniques.

7. The system of claim 1, wherein the aerospace commerce exchange platform comprises an ecommerce module configured to enable a first client to conduct a transaction with a second client as one of the exchange services for which billing is handled via the aerospace commerce exchange platform.

8. The system of claim 1, wherein the security module comprises processing circuitry at a centralized location in the network to manage authorization or authentication of the communication.

9. The system of claim 8, wherein the security module comprises distributed processing circuitry associated with management of authorization or authentication of the communication.

10. The system of claim 9, wherein asset data is provided in real-time from the aircraft and the asset data is provided via an asset data record maintained using the blockchain techniques.

11. The system of claim 10, wherein the exchange services include at least one service associated with the asset data record, and wherein multiple clients communicate with each other to perform the at least one service employing blockchain techniques.

12. The system of claim 1, wherein smart contracts are provided as one of the exchange services.

13. A platform for providing exchange services associated with an aerospace commerce exchange system, the platform being accessible to a plurality of clients comprising data producers and data consumers via an air-to-ground wireless communication network, the platform comprising processing circuitry configured to provide at least one of the exchange services and to define a security module configured to enable secure communication associated with the exchange services between the clients, wherein the platform is operably coupled to the network to provide the at least one of the exchange services to the data producers and the data consumers such that the data producers provide information to the platform to be accessed by the data consumers, wherein at least one of the data producers comprises an in-flight aircraft that is operably coupled to the aerospace commerce exchange platform via an air-to-ground wireless communication link to provide the information as data from components or sensors of the aircraft to the aerospace commerce exchange platform while the aircraft is in-flight, wherein the platform comprises a development module configured to enable one of the data consumers to use the information provided from the aircraft to create a tool accessible via the network for use as one of the exchange services, wherein the security module is configured to provide a distributed ledger for communication of the data from the components or sensor of the aircraft as an aircraft record for the aircraft, and from components or sensors of multiple other in-flight aircraft as respective aircraft records for the other in-flight aircraft, and wherein the data from the components or sensors of each of the aircraft and the other in-flight aircraft define a first level at which permissioned or permissionless blockchain techniques are employed to ensure authentication of the data, and wherein permissioned or permissionless blockchain techniques are further employed at a second level to ensure authentication of the aircraft record and the respective aircraft records for the other in-flight aircraft.

14. The platform of claim 13, wherein the at least one of the exchange services comprises providing the aircraft record and the respective aircraft records for the other in-flight aircraft to the data consumers to enable application development by the data consumers based on the aircraft record and the respective aircraft records for the other in-flight aircraft.

15. The platform of claim 14, wherein the aircraft record and the respective aircraft records for the other in-flight aircraft each comprise an aircraft maintenance record portion, an aircraft logbook portion or an environmental data recording portion.

16. The platform of claim 15, wherein one or more of the aircraft maintenance record portion, the aircraft logbook portion and the environmental data recording portion include asset data provided in real-time from the components or sensors of the aircraft and the other in-flight aircraft.

17. The platform of claim 13, wherein the aerospace commerce exchange platform comprises an ecommerce module configured to enable a first client to conduct a transaction with a second client as one of the exchange services for which billing is handled via the aerospace commerce exchange platform.

18. The platform of claim 17, wherein the security module comprises processing circuitry at a centralized location in the network to manage authorization or authentication of the communication.

19. The platform of claim 13, wherein asset data is provided in real-time from the aircraft and the asset data is provided via an asset data record maintained using the blockchain techniques.

20. The platform of claim 13, wherein the exchange services include at least one service associated with the asset data record, and wherein multiple clients communicate with each other to perform the at least one service employing blockchain techniques.

* * * * *